US012546140B2

(12) United States Patent
Daryadel

(10) Patent No.: US 12,546,140 B2
(45) Date of Patent: Feb. 10, 2026

(54) INTELLEGENT LOCK MECHANISM AND METHODS

(71) Applicant: Mohammad Mehdi Daryadel, Sanford, FL (US)

(72) Inventor: Mohammad Mehdi Daryadel, Sanford, FL (US)

( * ) Notice: Subject to any disclaimer, the term of this patent is extended or adjusted under 35 U.S.C. 154(b) by 0 days.

(21) Appl. No.: 17/707,808

(22) Filed: Mar. 29, 2022

(65) Prior Publication Data

US 2023/0228125 A1 Jul. 20, 2023

Related U.S. Application Data

(60) Provisional application No. 63/167,557, filed on Mar. 29, 2021.

(51) Int. Cl.
*E05B 47/00* (2006.01)
*G07C 9/00* (2020.01)

(52) U.S. Cl.
CPC ...... *E05B 47/0012* (2013.01); *G07C 9/00309* (2013.01); *G07C 9/00571* (2013.01); *E05B 2047/0067* (2013.01); *E05B 2047/0086* (2013.01); *G07C 2209/62* (2013.01)

(58) Field of Classification Search
None
See application file for complete search history.

(56) References Cited

U.S. PATENT DOCUMENTS 9,530,262 B2 * 12/2016 Johnson ................ H04W 4/027

* cited by examiner

*Primary Examiner* — K. Wong

(57) ABSTRACT

An intelligent lock mechanism includes a retrofittable apparatus comprising a constant temperature monitor, wherein the lock apparatus can be maintained at an operating temperature by engaging the motor to keep sufficient temperature for consistent operability.

20 Claims, 7 Drawing Sheets

INTELLEGENT LOCK MECHANISM AND METHODS

CROSS-REFERENCE TO RELATED APPLICATIONS

This application claims priority to U.S. Provisional Patent Application No. 63/167,557, entitled INTELLIGENT LOCK MECHANISM AND METHODS, filed Mar. 29, 2021.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

Field of Invention

The present disclosure generally relates to locks; more specifically, to wireless lock mechanisms having the capability to monitor and maintain operability in certain low temperatures with failsafe mechanical operating means in the event of a motor failure.

Description of Related Art

Cabinets for signal controllers, utilities, security systems and the like most often comprise locks to limit access to the cabinet. Many of the locks require a physical key that can be copied and once copied, access can be made largely without detection.

Today with greater bandwidth and more connectivity there are more devises being controlled through the Internet. Currently, it is common to control the following items in our homes: lights, thermostats, appliances, radios and locks.

BRIEF SUMMARY OF THE INVENTION

The instant invention product brings wireless access technologies to industrial, traffic, utility, communications, and security cabinets and the like. These cabinets are situated all across the world not only used to house a wide variety of equipment. This invention is a fully connected intelligent lock mechanism and method that can be monitored though a Ethernet connection using 10/100 or wireless. The connection can detect that status of the lock (open/close) or abnormal conditions. The lock also supports Bluetooth connectivity for communication with a smartphone. Accordingly, it is an object of the present invention to provide an intelligent lock mechanism.

Any documents or publications cited in this disclosure are incorporated by reference in their entirety, to the extent they are not inconsistent with the explicit teachings set forth herein.

DETAILED DISCLOSURE OF THE INVENTION

Figure 1:
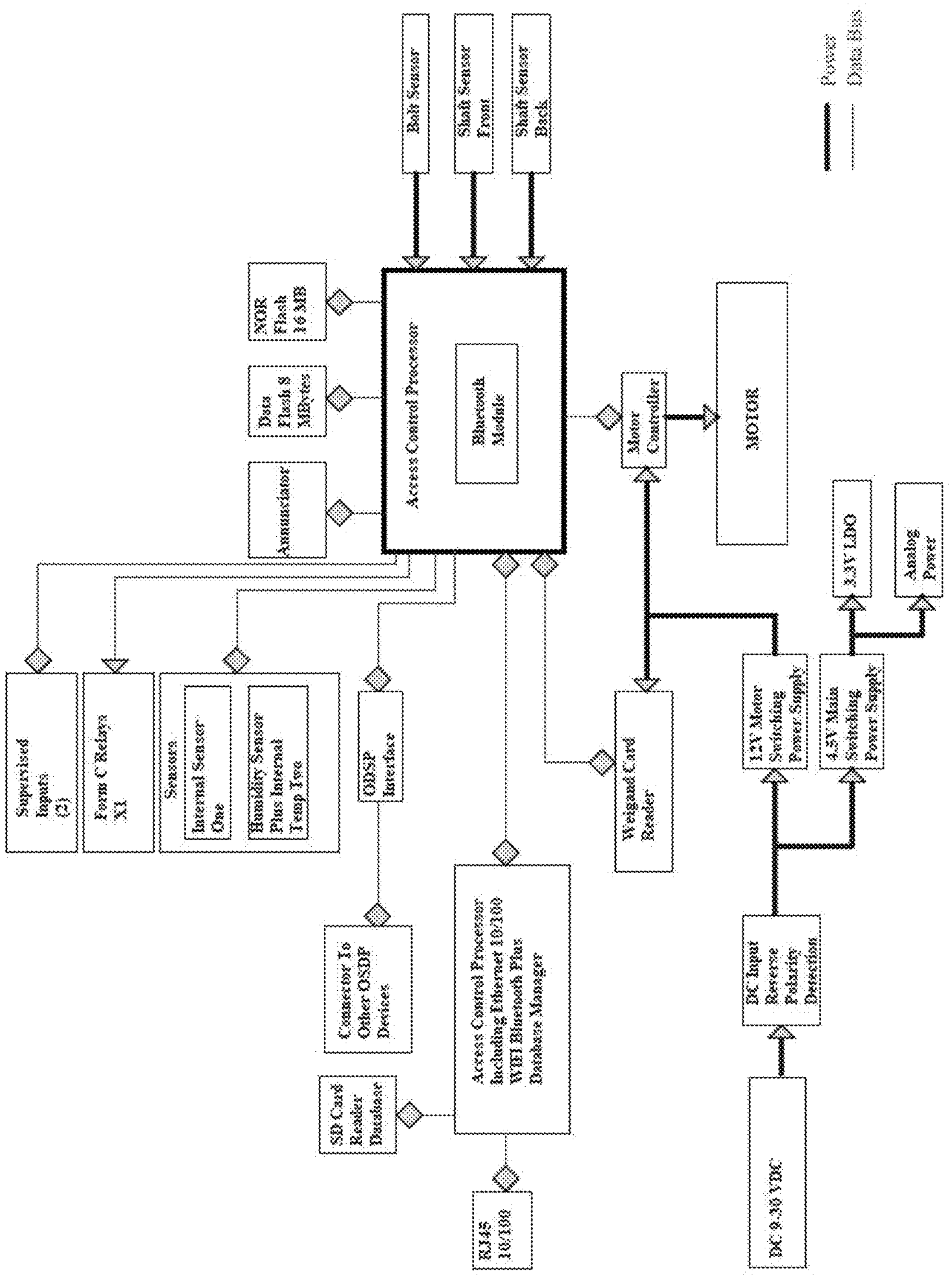
FIG. 1 is a block diagram of the intelligent lock mechanism according to aspects of the invention.
Figure 2A:
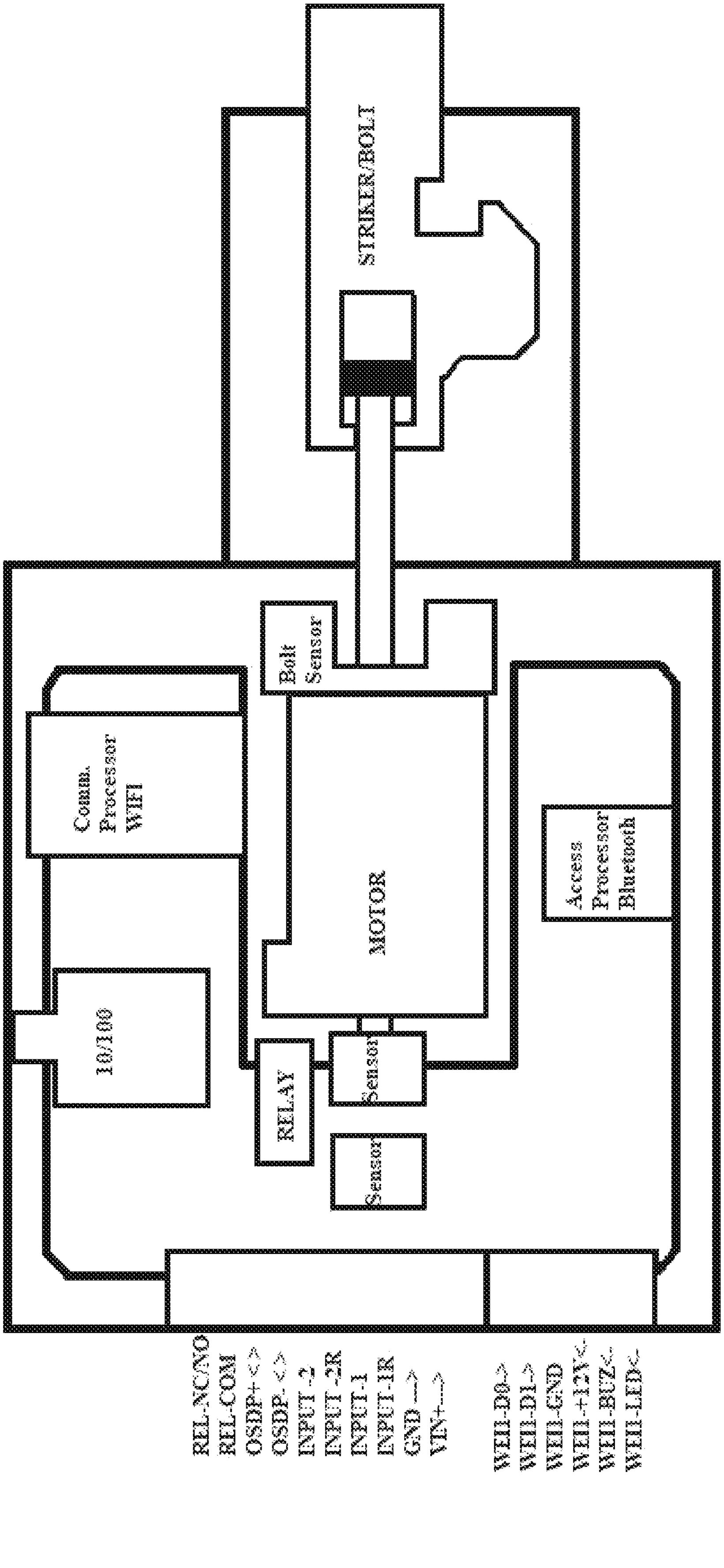
FIG. 2A is a schematic of the intelligent lock mechanism according to aspects of the invention
Figure 2B:
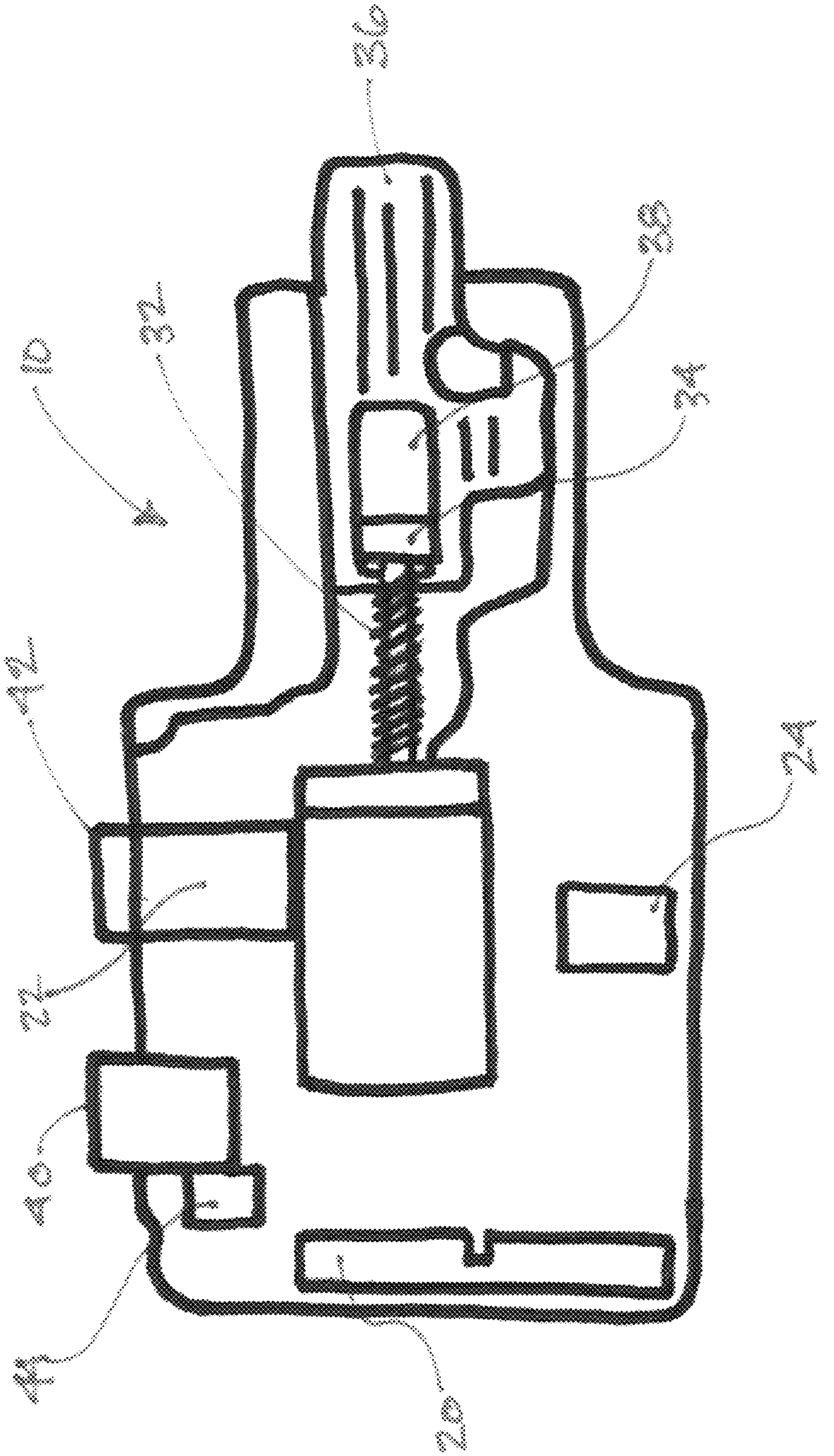
FIG. 2B is a plan view of the intelligent lock mechanism according to aspects of the invention.
Figure 3:
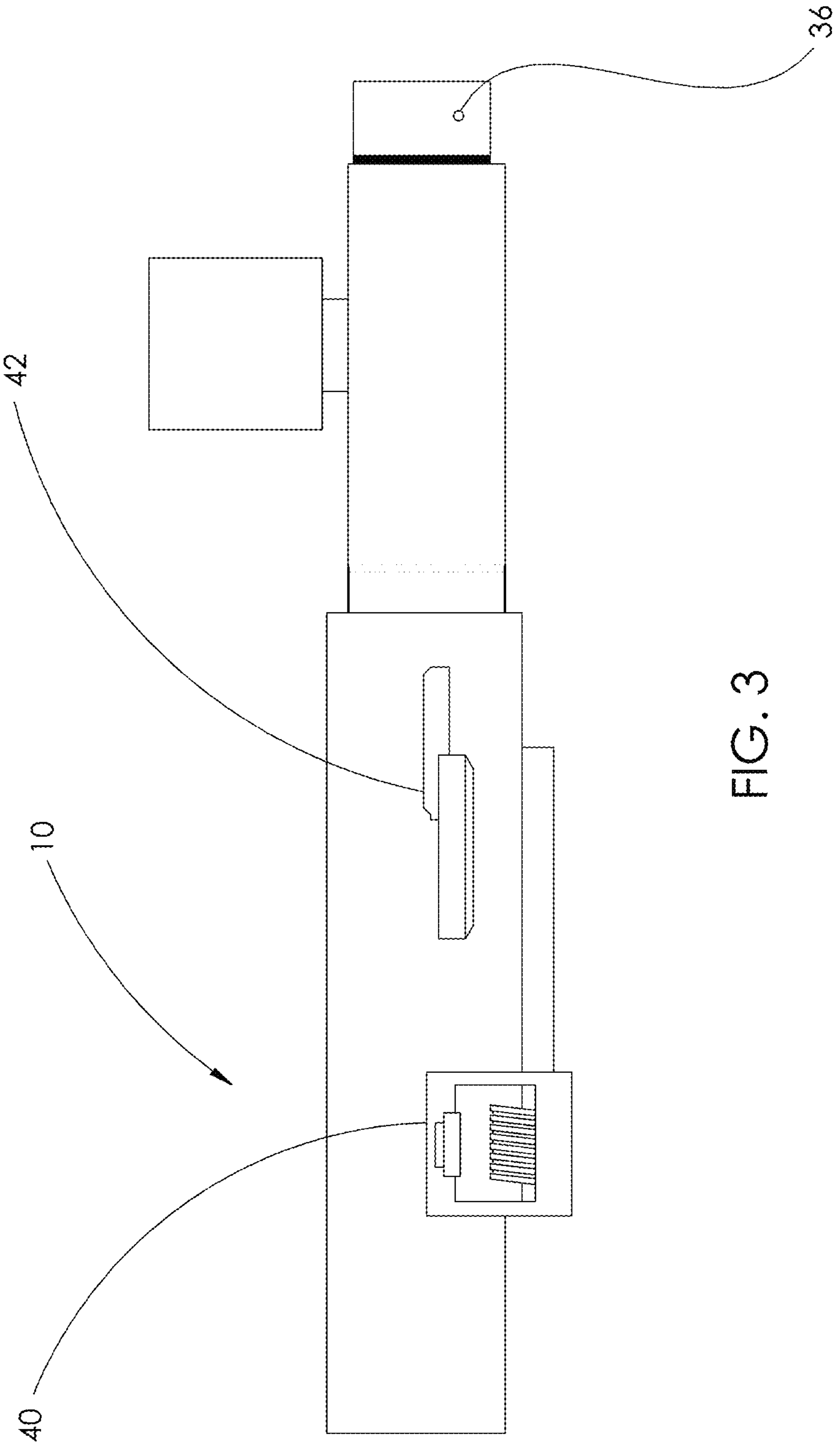
FIG. 3 is a side view of the intelligent lock mechanism according to aspects of the invention.
Figure 4:
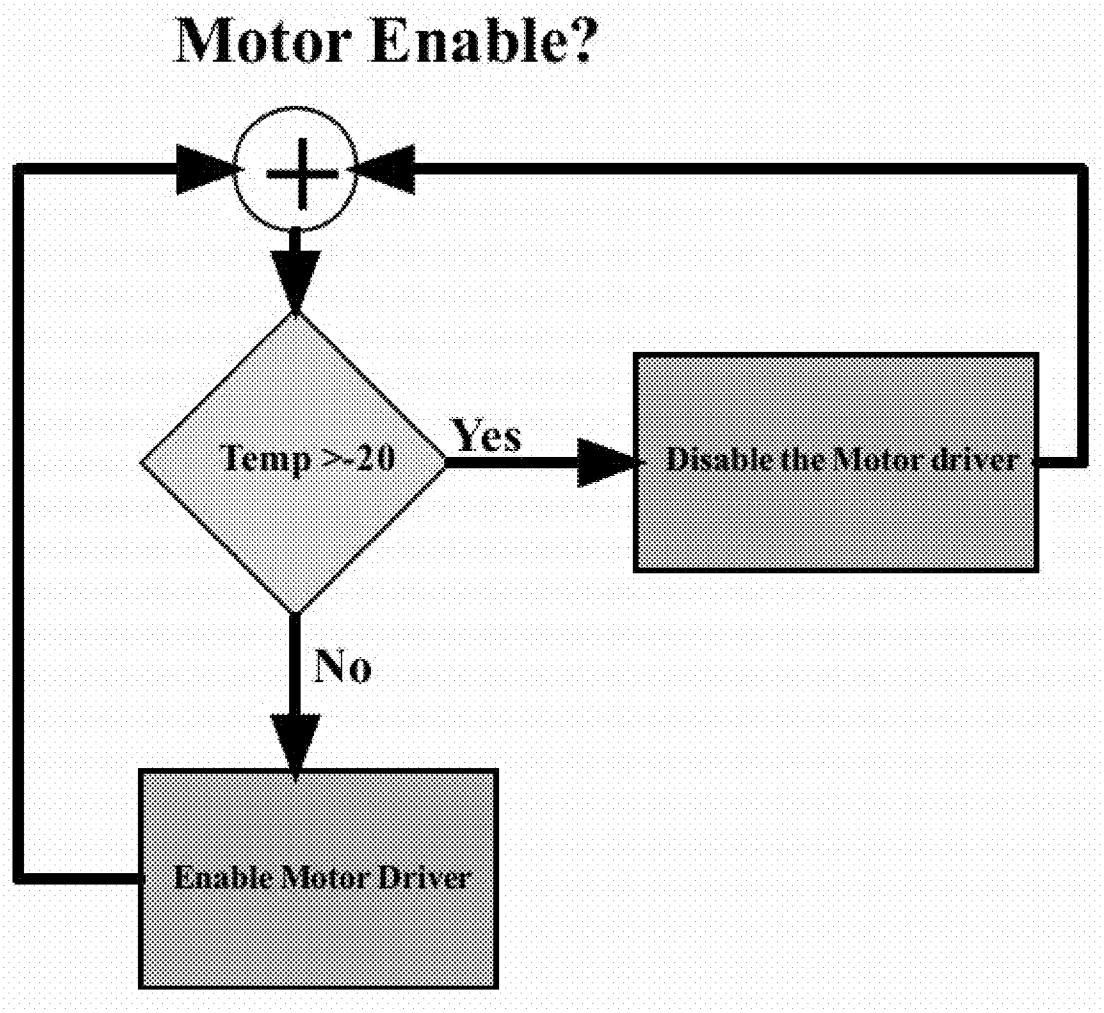
FIG. 4 is a motor enable flow chart of the intelligent lock mechanism according to aspects of the invention.
Figure 5:
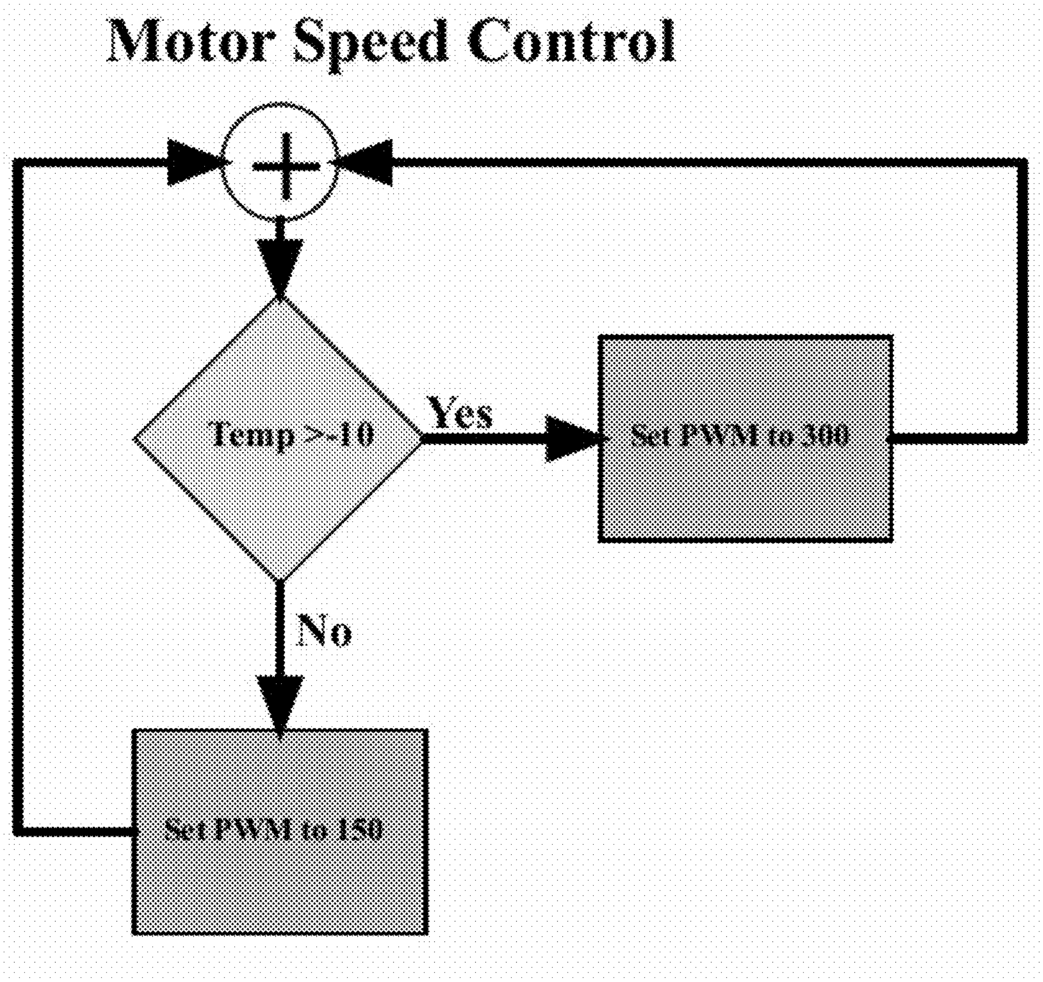
FIG. 5 is a motor speed flow chart of the intelligent lock mechanism according to aspects of the invention.
Figure 6:
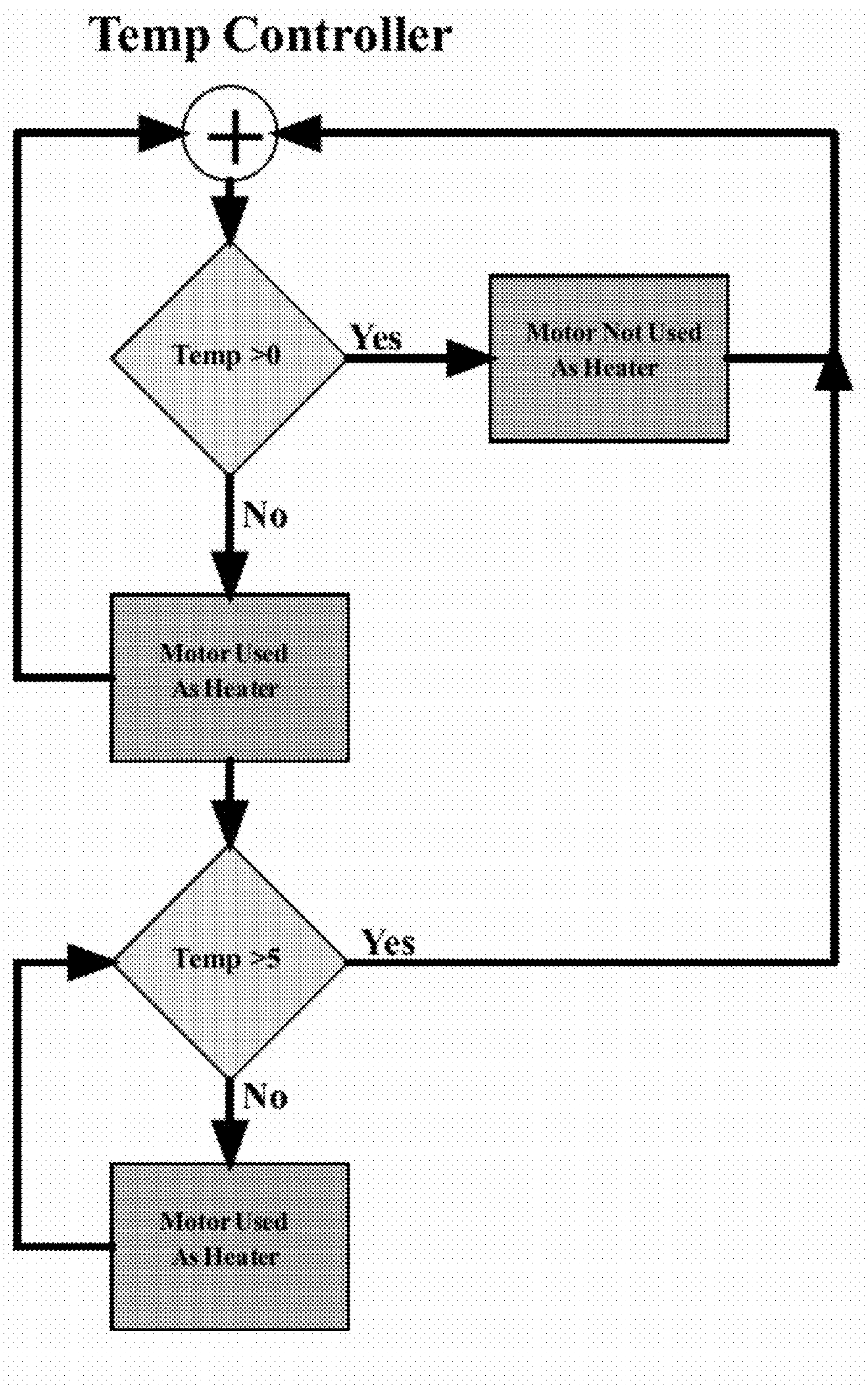
FIG. 6 is a temperature control flow chart of the intelligent lock mechanism according to aspects of the invention.

Referring now to FIGS. 1, 2A, 2B and 3, the intelligent lock mechanism 10 includes a power source input 20, a communication processor 22, an access control processor 24, a motor 30, shaft 32, a stop 34, and a bolt 36.

The power source input 20 receives power from a power source (not shown) sufficient to operate said communication processor 22, said access control processor 24, and said motor 30. The power source (not shown) can 20 be DC 9-30 VDC and can be connected to a reverse polarity detector (not shown), a 12V motor switching power supply (not shown), a 4.5V main switching power supply, 3.3V low dropout voltage (LDO) regulator (not shown), and/or analog power (not shown) for proper operation of the intelligent lock mechanism 10 and operation and interpretation of the various sensors, as needed.

The communication processor 22 can include an Ethernet connection such as, for example, an RJ45 10/100 jack 40 or the like for internet or other network connectivity and communication. The communication processor 22 can further include Wi-Fi (not shown) for internet or other network connectivity and communication. The Ethernet 40 and Wi-Fi (not shown) internet connectivity can allow the intelligent lock mechanism 10 to connect to an external database (not shown) for confirmation of access control permission. The communication processor 22 can further be connected to an SD card reader 42 which is capable of internally storing access data, such as, for example, user permission and other information.

The access control processor 24 can include at least one supervised input (not shown) for electronically requesting the condition of the intelligent lock mechanism, such as, for example, locked, unlocked, manually overridden, forced entry, door position, temperatures, humidity levels, and other important information from an external location. The access control processor 24 can include additional supervised inputs (not shown) to allow the system to be bypassed when necessary as well as other needed functions.

The access control processor 24 can further include a relay 44 in communication with the motor controller (not shown) and a motor controller (not shown) for controlling the motor 30. A temperature sensor (not shown) is connected to or proximate the motor (30) for detecting the temperature of the motor 30. When the temperature of the motor goes below a certain predetermined temperature, for example zero (0) degrees Celsius, the intelligent lock mechanism automatically enables the motor 30 to produce heat by selective sequencing of the motor 30.

The motor 30 comprises a plurality of windings (not shown). Depending on the sequencing of the electrical signal sent to the motor 30 through the relay 44 and motor controller (not shown) the motor 30 can alternatively be heated or operated. The relay 44 can be a Form C relay. By way of example, if the electrical signal is sequenced, the motor 30 will operate as intended. Alternatively, if the electrical signal is not sequenced, the motor 30 will generate heat. The motor will heat to a predetermined safe motor temperature then the intelligent lock mechanism 10 will stop using the motor 30 to generate heat. The temperature of the intelligent lock mechanism 10 can be controlled using the motor 30 in temperatures as low as −35 degrees centigrade.

The access control processor 24 can further include a humidity and temperature sensor (not shown) to allow for the continuous detection of the humidity and temperature levels inside the intelligent lock mechanism 10. Low temperature levels can activate the auto-heating function of the motor 30 and humidity levels can be monitored and reported to a user to ensure that the intelligent lock mechanism is operating within proper humidity levels or to warn when humidity levels reach predetermined levels.

The access control processor 24 can further include a bolt sensor (not shown) for detecting the position of the bolt 36, a first shaft sensor (not shown) to confirm the position of the shaft 32 in the locked position, a second shaft sensor to confirm the position of the shaft 32 in the open position. Bolt sensor (not shown) can with the access control processor 24, can indicate when a mechanical opening of the intelligent lock mechanism 10 is made with a key, or whether there is a forced opening of the intelligent lock mechanism 10 by other means.

The access control processor 24 can further include Bluetooth connectivity for communicating with an external device.

The access control processor 24 can further include non-volatile flash memory to record and maintain a log of transactions, such as, for example, local and external opening events, involving the intelligent lock mechanism 10.

The access control processor 24 can further include data flash memory to maintain back-up programs for the access control processor 24. In the event of failure or malfunction of the access control processor 24, it can revert to a program in the data flash memory (not shown) as back up.

The access control processor 24 can further include an annunciator (not shown) to provide an audible signal to the user during operation. The annunciator can provide different audio signals for different operational functions or inputs.

The access control processor 24 can further include non-volatile flash memory to record and maintain a log of transactions, such as, for example, local and external opening events, involving the intelligent lock mechanism 10.

The access control processor 24 can further include a card reader (not shown), such as, for example an RFID card reader (not shown) or, more particularly a Weingand card reader (not shown) to read a user's access card to allow access to operation of the intelligent lock mechanism 10.

The access control processor 24 can further include an Open Supervised Device Protocol (OSDP) interface (not shown) in further communication with other IDSP devices to allow access to operation of the intelligent lock mechanism 10.

The access control processor 24 can accommodate indefinite number of users.

The motor 30 can be selectively controlled through the motor controller (not shown) to operate the intelligent lock mechanism 10 or generate heat through the use of selective sequencing of coils (not shown) in said motor 30. The motor 30 can be a stepper type motor or any other type of motor that may be manipulated by selective sequencing to operate or generate heat, as needed.

As stepper motor behavior changes at low temperatures temperature sensor (not shown) in conjunction with the access control processor 24 detect the ambient temperature of the intelligent lock mechanism 10 and adjusts the frequency that the motor 30 steps. The motor 30 operates as slower speeds at low temperatures. This can prevent damage to the motor 30 and intelligent lock mechanism 10 from the low temperatures and ensure operability.

In the event of a motor 30 failure, the intelligent lock mechanism 10 includes a manual override (not shown) with a key (not shown). The motor 30 and bolt 36 can be attached by the stop 34 in a slot 38 in the bolt 36 that can allow the bolt 36 to be operated separate from the motor 30 in the event of motor 30 failure.

The motor can be connected to a shaft at a first end of the shaft 32. The shaft can be connected to a stop 34 at a second end of the shaft 32 and wherein said stop 34 is connected to said bolt 36 to selectively position the bolt 36 in an open or closed configuration.

The intelligent lock mechanism 10 can include communication technology such as Ethernet 10/100, WiFi 2.4G, Bluetooth 5.0, and the like.

The intelligent lock mechanism 10 generally operates at temperature is between −35° C. and +74° C. The intelligent lock mechanism 10 can be NEMA TS2 compliant for harsh environments.

One particularly significant feature of the mechanism is its ability to be used in retrofit market utilizing existing locks (not shown). The intelligent lock mechanism 10 can include bolts (not shown), mounting-plates (not shown), and strike plates that complement different manufacturers of traditional cabinet locks.

Following are examples illustrating procedures for practicing the invention. These examples should be construed to include obvious variations and not limiting.

EXAMPLE 1

An intelligent lock mechanism 10 includes: a power source input 20, a communication processor 22, an access control processor 24, a motor 30, shaft 32, and a bolt 36. The power source (not shown) providing power to the power source input 20 is sufficient to operate the communication processor 22, the access control processor 24, and the motor 30. The communication processor 22 further comprises Ethernet 40 and/or WiFi (not shown) internet connectivity to connect to an external database (not shown) for confirmation of access control permission.

The access control processor 24 further comprises at least one supervised input (not shown) for electronically requesting the condition of the intelligent lock mechanism 10, a relay 44 and a motor controller (not shown) for controlling the motor 30, a temperature sensor (not shown) for detecting the temperature of the motor 30, a humidity and temperature sensor (not shown) for detecting the humidity and temperature inside the intelligent lock mechanism 10, a bolt sensor (not shown) for detecting the position of the bolt 36, a first shaft sensor (not shown) to confirm the position of the shaft 32 in the locked position, a second shaft sensor (not shown) to confirm the position of the shaft 32 in the open position, and Bluetooth connectivity (not shown) for communicating with an external device (not shown).

The motor 30 can be selectively controlled through the motor controller (not shown) to operate the intelligent lock mechanism 10 or generate heat through the use of selective sequencing of coils in said motor 30 and wherein the motor 30 is connected to the shaft 32 at a first end of the shaft 32.

The shaft 32 is connected to a stop 34 at a second end of said shaft 32 and the stop 34 is connected to the bolt 36 to selectively position the bolt 36 in an open or closed configuration.

When used alone or in connection with additional intelligent lock mechanisms on the same cabinet, the foregoing example describes a primary intelligent lock mechanism. In addition to primary intelligent lock mechanisms, secondary intelligent lock mechanisms can also be used in communication with a primary devices to lower the overall cost of multiple devices on the same cabinet. In general, primary intelligent lock mechanisms have external communication abilities whereas secondary devices generally do not and can only communicate with primary intelligent lock mechanisms.

When a command is given to unlock a cabinet using a plurality of intelligent lock mechanisms, the system sequences opening the primary intelligent lock mechanism first, then sequentially opens secondary intelligent lock mechanisms to reduce the amount of energy drawn by the devices. In general, the intelligent lock mechanisms do not draw more than 10 V at any one time and can selectively allow for the opening of multiple intelligent lock mechanisms in a single cabinet from a single signal.

Inasmuch as the preceding disclosure presents the best mode devised by the invention for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and scope of the following claims.

I claim:

1. An intelligent lock mechanism comprising:

a power source, a communication processor, an access control processor, a motor, shaft, and a bolt;

wherein said power source is sufficient to operate said communication processor, said access control processor, and said motor;

wherein said communication processor further comprises ethernet or WiFi internet connectivity to connect to an external database for confirmation of access control permission;

wherein said access control processor further comprises at least one supervised input for electronically requesting the condition of the intelligent lock mechanism, a relay and a motor controller for controlling said motor, a temperature sensor for detecting the temperature of the motor, a humidity and temperature sensor for detecting the humidity and temperature inside the intelligent lock mechanism; a bolt sensor for detecting the position of the bolt, a first shaft sensor to confirm the position of the shaft in the locked position, a second shaft sensor to confirm the position of the shaft in the open position, Bluetooth connectivity for communicating with an external device;

wherein the motor is selectively controlled through the motor controller to operate the intelligent lock mechanism or generate heat through the use of selective sequencing of coils in said motor and wherein the motor is connected to said shaft at a first end of the shaft; and wherein said shaft is connected to a stop at a second end of said shaft and wherein said stop is connected to said bolt to selectively position the bolt in an open or closed configuration.

2. The intelligent lock mechanism of claim 1 further comprising a manual override with a key, in the event of a motor failure.

3. The intelligent lock mechanism of claim 1 further comprising a card reader for access to the device.

4. The intelligent lock mechanism of claim 1, wherein a report is relayed to the user regarding the condition of the device and said report includes one or more conditions selected from the group consisting of: current lock position; manual key overrides; and forced entries.

5. The intelligent lock mechanism of claim 1, wherein the access control processor further includes a second supervised input for allowing a user to bypass the intelligent lock mechanism access control.

6. The intelligent lock mechanism of claim 1, wherein the access control processor further includes non-volatile memory to collect and store the access transaction history of the device.

7. The intelligent lock mechanism of claim 1, wherein the access control processor further includes an ODSB interface for access control.

8. The intelligent lock mechanism of claim 1, wherein the access control processor further includes an SD card reader to store user access permission data.

9. The intelligent lock mechanism of claim 1, wherein the access control processor further includes an annunciator to create audible sounds corresponding to user input.

10. An intelligent lock mechanism system comprising:

a primary intelligent lock mechanism comprising a power source, a communication processor, an access control processor, a motor, shaft, and a bolt;

wherein said power source is sufficient to operate said communication processor, said access control processor, and said motor;

wherein said communication processor further comprises ethernet or WiFi internet connectivity to connect to an external database for confirmation of access control permission;

wherein said access control processor further comprises at least one supervised input for electronically requesting the condition of the intelligent lock mechanism, a relay and a motor controller for controlling said motor, a temperature sensor for detecting the temperature of the motor, a humidity and temperature sensor for detecting the humidity and temperature inside the intelligent lock mechanism; a bolt sensor for detecting the position of the bolt, a first shaft sensor to confirm the position of the shaft in the locked position, a second shaft sensor to confirm the position of the shaft in the open position, Bluetooth connectivity for communicating with an external device;

wherein the motor is selectively controlled through the motor controller to operate the intelligent lock mechanism or generate heat through the use of selective sequencing of coils in said motor and wherein the motor is connected to said shaft at a first end of the shaft;

wherein said shaft is connected to a stop at a second end of said shaft and wherein said stop is connected to said bolt to selectively position the bolt in an open or closed configuration at least one secondary intelligent lock mechanism in communication with the primary intelligent lock mechanism comprising a motor, shaft, and a bolt;

wherein the motor is selectively controlled through a motor controller governed by signals generated from the primary intelligent lock mechanism to operate the secondary intelligent lock mechanism or generate heat through the use of selective sequencing of coils in said motor and wherein the motor is connected to said shaft at a first end of the shaft;

wherein said shaft is connected to a stop at a second end of said shaft and wherein said stop is connected to said bolt to selectively position the bolt in an open or closed configuration.

11. The intelligent lock mechanism system of claim 10 further comprising a manual override with a key for each primary and secondary intelligent lock mechanism, in the event of motor failure.

12. The intelligent lock mechanism system of claim 10 wherein the opening of the system comprises opening said primary intelligent lock mechanism first and then opening the secondary intelligent lock mechanism afterwards.

13. The intelligent lock mechanism system of claim 10 comprising a plurality of secondary intelligent lock mechanisms.

14. The intelligent lock mechanism system of claim 10 wherein the opening of the system comprises opening said primary intelligent lock mechanism first and then sequentially opening the plurality of secondary intelligent lock mechanisms one at a time.

15. The intelligent lock mechanism system of claim 10, wherein the secondary lock mechanism comprises sensors to monitor device conditions including current lock position, manual key overrides, and forced entries.

16. The intelligent lock mechanism system of claim 14, wherein the access control processor on the primary intelligent lock mechanism further includes non-volatile memory to collect and store the access transaction history of the device.

17. The intelligent lock mechanism system of claim 14, wherein the access control processor on the primary intelligent lock mechanism further includes an ODSB interface for access control.

18. The intelligent lock mechanism system of claim 14, wherein the access control processor on the primary intelligent lock mechanism further includes an SD card reader to store user access permission data.

19. The intelligent lock mechanism of claim 14, wherein the access control processor further includes an annunciator to create audible sounds corresponding to user input.

20. An intelligent lock mechanism system comprising:

a primary intelligent lock mechanism comprising a power source, a communication processor, an access control processor, a motor, shaft, and a bolt;

wherein said power source is sufficient to operate said communication processor, said access control processor, and said motor;

wherein said communication processor further comprises ethernet or WiFi internet connectivity to connect to an external database for confirmation of access control permission;

wherein said access control processor further comprises at least one supervised input for electronically requesting the condition of the intelligent lock mechanism, a relay and a motor controller for controlling said motor, a temperature sensor for detecting the temperature of the motor, a humidity and temperature sensor for detecting the humidity and temperature inside the intelligent lock mechanism; a bolt sensor for detecting the position of the bolt, a first shaft sensor to confirm the position of the shaft in the locked position, a second shaft sensor to confirm the position of the shaft in the open position, Bluetooth connectivity for communicating with an external device;

wherein the motor is selectively controlled through the motor controller to operate the intelligent lock mechanism or generate heat through the use of selective sequencing of coils in said motor and wherein the motor is connected to said shaft at a first end of the shaft;

wherein said shaft is connected to a stop at a second end of said shaft and wherein said stop is connected to said bolt to selectively position the bolt in an open or closed configuration a plurality of secondary intelligent lock mechanism in communication with the primary intelligent lock mechanism comprising a motor, shaft, and a bolt;

wherein the motor is selectively controlled through a motor controller governed by signals generated from the primary intelligent lock mechanism to operate the secondary intelligent lock mechanism or generate heat through the use of selective sequencing of coils in said motor and wherein the motor is connected to said shaft at a first end of the shaft;

wherein said shaft is connected to a stop at a second end of said shaft and wherein said stop is connected to said bolt to selectively position the bolt in an open or closed configuration; and wherein the opening of the system comprises opening said primary intelligent lock mechanism first and then sequentially opening the plurality of secondary intelligent lock mechanisms one at a time.

* * * * *